Nov. 4, 1969   H. W. ANDERSEN ET AL   3,476,506
STERILIZATION APPARATUS

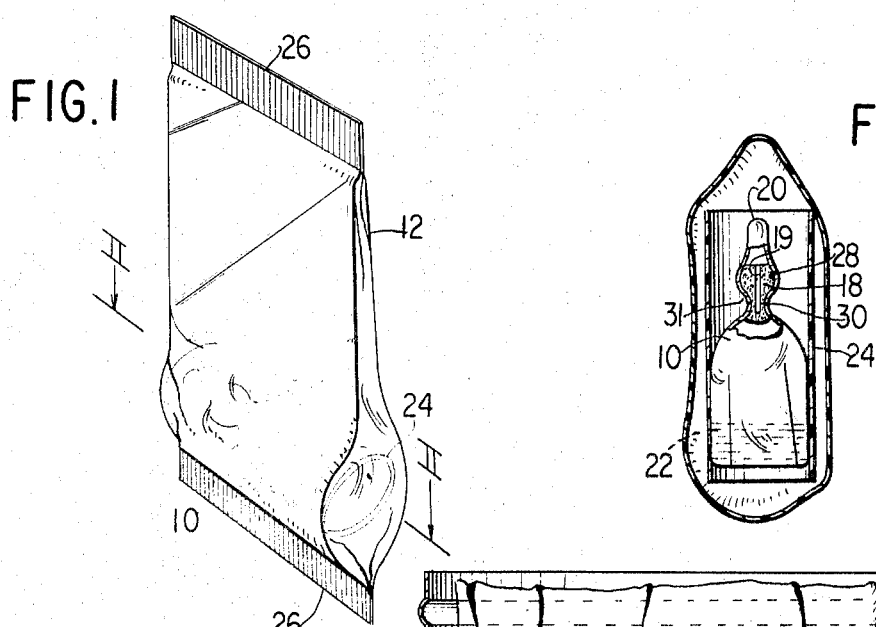
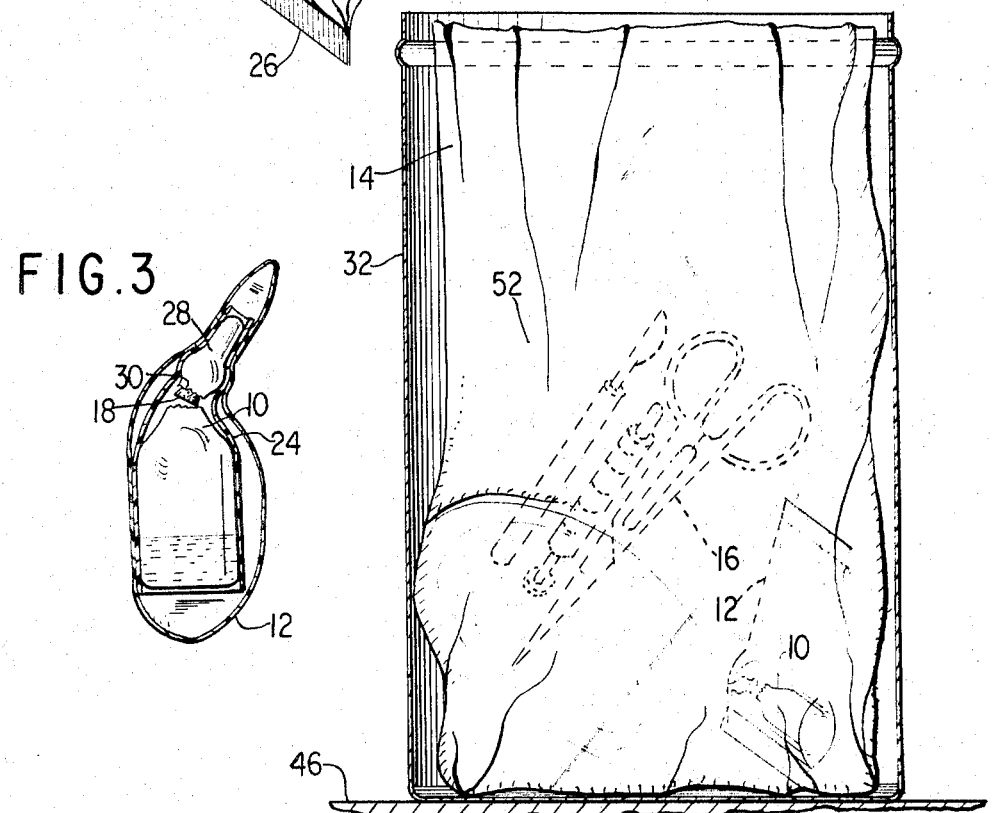
FIG.4

Filed April 14, 1965   2 Sheets-Sheet 2

INVENTORS
Harold Willis Andersen
Howard W. Andersen and
BY Charles H. Thompson

ATTORNEYS

United States Patent Office

3,476,506
Patented Nov. 4, 1969

3,476,506
STERILIZATION APPARATUS
Harold Willids Andersen, Oyster Bay, Harold W. Andersen, Laurel Hollow, and Charles H. Harrison, Oyster Bay Cove, N.Y., assignors to H. W. Andersen Products, Inc., Oyster Bay, N.Y., a corporation of New York
Filed Apr. 14, 1965, Ser. No. 448,090
Int. Cl. A61l 3/00
U.S. Cl. 21—91                                                                                   8 Claims

ABSTRACT OF THE DISCLOSURE

Apparatus for sterilizing articles such as surgical and medical instruments and devices in which a gaseous sterilant under pressure in a sealed ampule is enclosed within a gas permeable enclosure which is inserted, after breaking the ampule, in a second gas permeable enclosure with the articles to be sterilized, the permeability of the enclosures being predetermined so that gas is released through the first enclosure at a rate sufficient to establish sterilization conditions in the second enclosure and gas is released from the second enclosure to ambient atmosphere at a rate which maintains sterilization conditions therewithin while diffusing the sterilant to ambient air at a non-toxic, non-flammable concentration.

---

This invention relates to an apparatus and method for sterilizing surgical, medical, dental and other instruments, tools, apparatus, and the like using a gaseous sterilant.

Commercial sterilization has been performed on large items and on large quantities of instruments, tools and apparatus with sterilants such as ethylene oxide gas in large pressure vessels or autoclaves at elevated temperatures and pressures. However, the methods employed are not readily adaptable nor are they practical for use in sterilizing small quantities of instruments, tools, and apparatus as might be required, for example, in doctors' offices, operating rooms, hospital supply rooms and other locations. One reason for this is that experienced and trained personnel are required to handle these larger sterilizing units because of the many difficulties and dangers attendant their use and incident to the physical and chemical properties of the sterilant. For example, ethylene oxide mixed with air is concentrations of greater than approximately 30,000 parts per million is flammable and, if contained, it is explosive. Ethylene oxide boils at 50° F. Its vapor pressure at room temperature (68 F.) is 20 p.s.i. Care must be taken in handling this sterilant as its vapors are toxic to humans at concentrations greater than 3,000 parts per million (acute exposure).

The need for small capacity sterilizing units for local use is also manifested by the advent of the widespread use of heat sensitive plastics in equipment and apparatus requiring sterilization which might be adversely affected by heat sterilization e.g. steam.

Accordingly, an object of this invention is the provision of sterilization apparatus for use with gaseous sterilants, such as, for example, ethylene oxide or a sterilant having similar physical characteristics or properties, which operates at room temperatures and at pressures at or near atmospheric, which is safe to operate by unskilled personnel, which is economical to manufacture and use and which is commercially and practically feasible for widespread general use.

Another object is to provide an improved apparatus and method for sterilizing equipment and apparatus which is light weight and portable and which is adaptable for use in offices and in small installations without the need of heavy, bulky, complicated or expensive equipment and apparatus.

Yet another object is the provision of a method and apparatus which avoids bringing into contact with the items being sterilized heat, moisture, or corrosive liquids which might damage or impair delicate or heat sensitive instruments.

The aforesaid objects of the present invention and other objects which will become apparent as the description proceeds are achieved, in one embodiment, by utilizing a first enclosure made at least partially of a semipermeable membrane capable of passing a gaseous sterilant therethrough. This first enclosure along with the items to be sterilized are placed within a second enclosure. The first enclosure is supplied with a gaseous sterilant, for example from an ampule of sterilant within the first enclosure, which diffuses through the semipermeable membrane of the first enclosure into the second enclosure to sterilize the items contained in the latter. The second enclosure maintains a concentration of gaseous sterilant in the second enclosure sufficient to sterilize the instruments and apparatus therein and may be used to safely disperse the gaseous sterilant to the surrounding atmosphere. In an alternate embodiment, the sterilant may be released directly into the second enclosure.

A practical embodiment of the invention is shown in the accompanying drawings, wherein:

FIG. 1 is a perspective view of a sterilant ampule within a sealed enclosure or bag.

FIG. 2 represents a sectional view taken along the line II—II of FIG. 1.

FIG. 3 represents a sectional view similar to FIG. 2 but showing how the top of the ampule is broken to release sterilant.

FIG. 4 is a sectional view showing the ampule and sealed bag of FIG. 1 along with instruments to be sterilized in a second enclosure or bag within a container.

Figure 5:
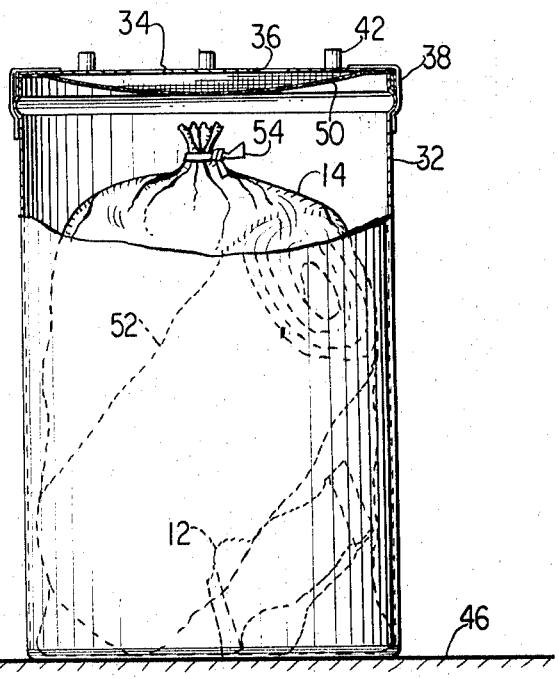
FIG. 5 is a partial sectional view similar to FIG. 4 but showing the outer second enclosure closed off and a cover on the container.

In the illustrated embodiment, the sterilant will sometimes be referred to as ethylene oxide, however, it is to be understood that other sterilants having physical characteristics and properties similar to ethylene oxide may be used.

With specific reference to the form of the invention illustrated in the drawings, and referring particularly to FIG. 1, there is shown a source of sterilant suitably contained such as in an ampule 10. The ample 10 is in turn contained within an enclosure which may be in the form of a bag 12. The enclosure or bag 12 is sealed and totally encloses the ampule 10 so that when sterilant is released from the ampule 10 in gaseous form, it will diffuse through the walls of the bag 12 as will be further described. The bag 12 containing the ampule 10 is placed within a second enclosure such as the bag 14 along with the items or instruments 16 to be sterilized. The bag 14 is then closed as will be described so that, as the sterilant diffuses through the walls of the bag 12, such sterilant will pass into the bag 14 containing the instruments 16 to sterilize the latter. Both bags 12 and 14 are made of a semi-permeable material which allows the gaseous sterilant to pass therethrough at a rate which provides a sufficient concentration within the bag 14 to sterilize the instruments 16 and at a rate in which neither toxic nor explosive levels of the gaseous sterilant are reached in the atmosphere surrounding the container 32 as the gas diffuses through the bag 14 to the atmosphere.

It will be observed that the function of the bags 12 and 14 is to diffuse a gaseous sterilant therethrough. Accordingly, it will be evident that other types of structures utilizing a semipermeable membrane may be used in place of these bags. For example, the bag 14 may be constructed partially of a rigid structure having a semi-permeable membrane in the form of a panel therein.

Turning to the more specific details of construction shown in the illustrated embodiment, the ampule 10 is preferably a sealed gas tight container which may be opened by manipulation and which may be made from a breakable material such as glass. The ampule 10 is adapted to be broken while in the bag 12, as will be described, to allow the release of gaseous sterilant into the bag 12. The ampule 10 is provided with a stopper 18 constructed of a self-sealing material such as natural rubber. The stopper 18 is inserted into the spout 28 of the glass ampule 10 through the open top thereof and firmly seated in the narrow neck 31 of the ampule prior to filling of the latter with liquid ethylene oxide. An open top on the spout is not shown in the drawings but it will be understood that the spout is initially formed this way and subsequently sealed as will be described. The ampule 10 is filled under pressure with the sterilant by a cannula such as a hollow bore hypodermic needle which is inserted through the stopper 18 into the body of the ampule. The stopper 18, which as previously mentioned, is self-sealing, closes the hole made by the hypodermic needle after the latter is withdrawn, acts as an effective barrier between the ethylene oxide vapor and the mouth of the ampule so that the open top of the ampule may be heat sealed at 20 as by a propane-oxygen flame without igniting the vapor of the sterilant. The stopper 18 may be provided with an axial passageway 19 which stops short of the axial length of the stopper to provide a guide for the hypodermic needle and to provide a thinner wall for the needle to penetrate.

When sealed in the ampule, the ethylene oxide is maintained largely in a liquid state, as represented by the numeral 22 in FIG. 2, in the bottom of the ampule 10 by the vapor pressure of the gaseous sterilant thereabove.

After sealing of the ampule 10, the latter may be placed in a protective flexible sleeve 24 so that sharp edges or spikes of glass resulting from the breaking off of the top of the ampule, as will be described, will not puncture the bag 12. By way of example this protective sleeve 24 may be a cylindrical vinyl tube of 1/16 inch thickness in which the open ends project beyond the ampule 10 to reside adjacent the side walls of the bag 12 as illustrated.

Once the ampule 10 is sealed and placed in the protective sleeve 24, the assembly is placed into the bag 12 and the latter sealed. The bag 12, as previously mentioned, is made of a semi-permeable material such as, for example, a film of polyethylene. The bag 12 may be in the form of a sleeve suitably heat sealed at either end as shown at 26. The rate of diffusion of the sterilant through the semi-permeable walls of the bag 12 is predictable and may be controlled by selecting the proper dimensions, thickness and pore size (i.e. permeability) of the bag 12.

After the bag 12 is sealed with the ampule therein, the latter is ready to release the gaseous sterilant into the bag 12. The release is accomplished by manually fracturing or breaking off the spout 28 of the glass ampule 10 along a score line 30 preformed around the narrow neck 31 of the ampule. Thus, it will be evident that it is a relatively simple operation to grasp the spout 28 of the ampule 10 with one hand by compressing the bag 12 and sleeve 24 adjacent thereto, to grasp the main body of the ampule 10 with the other hand and to cant the spout 28 and thereby break it off. This operation is best shown in FIG. 3. In order to insure that the plug 18 is removed from the main body of the ampule when the spout 28 is snapped off, the plug 18 may be provided with a portion above the neck 30 of the ampule which is relatively larger than the portion below the neck 30. Thus it will be seen in FIG. 2 that the converging walls at the neck of the ampule above the score line 31 will prevent the larger upper portion of the plug 12 from coming out of the spout 28 of the ampule as the spout is snapped off while the smaller lower portion will be compressed sufficiently due to its resiliency to squeeze past the converging walls at the neck of the ampule below the score line 30. The release of the lower portion of the stopper 18 from the main body of the ampule is further facilitated by the pressure of the sterilant in the ampule acting thereon.

After the sterilant is released from the ampule and enters the bag 12 it is ready to be used in the sterilizing operation. Thus, the bag 12 with the released sterilant therein is placed in the second enclosure or bag 14 along with the instruments 16 to be sterilized. As previously mentioned this second bag may also be made of a semi-permeable material to control the release of gaseous sterilant to the surrounding atmosphere. By way of example the bag may be made from polyethylene, as in the case of bag 12, and may have the form of a conventional open top bag, the open top providing access for the instruments 16 and the sealed bag 12. Before the instruments 16 and sealed bag 12 are placed in the larger bag 14, however, the latter may first be placed in a container 32 which may be an open top can which may be reused.

Figure 6:
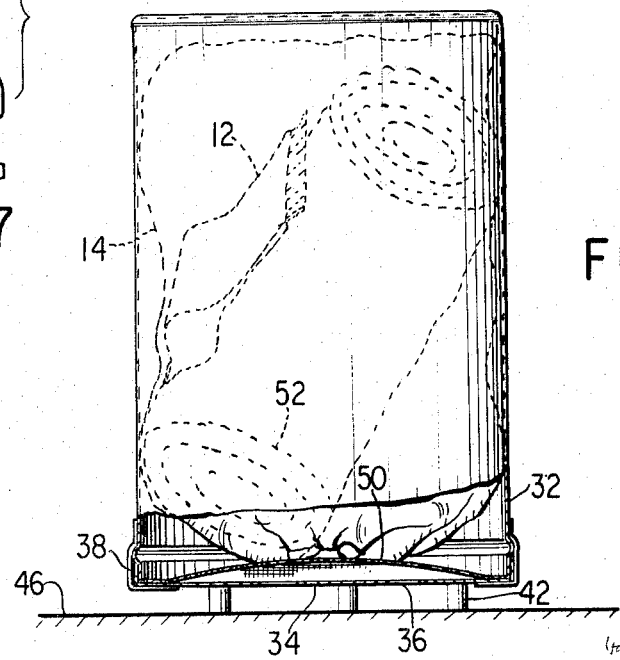
FIG. 6 is a partial sectional view similar to FIG. 5 but inverted.

The container 32 is made of an electrically conductive material, for example, stainless steel, so that it will protect against inadvertent ignition of the sterilant by static electrical discharge. The container 32 also acts as an open flame shield for the contents therein. It will be understood that the container 32 may be constructed wholly or partially from materials other than metal which will protect against inadvertent ignition by static electrical discharge. For example, it may be made of conductive rubber or cardboard lined with metallic foil such as steel or aluminum. It is generally preferred, however, that the container 32 be made fire-proof and that it be capable of containing a low grade explosion. As best shown in FIGS. 5 and 6, the container 32 is provided with a cover 34 which is preferably affixed to the can by fastening means such as the lid locks 38 or by a threaded engagement (not shown). The cover 34 is provided with perforations 36 to release the gaseous sterilant to the surrounding atmosphere as will be further described. The cover 34 may also be provided with lugs 42 which act as feet when the container is inverted (FIG. 6) to insure an air space between the vented cover 34 and the surface 46 on which the inverted container is placed. The cover 34 may further be provided with a convex screen 50 to provide a space within the cover 34 to facilitate the passage of gaseous sterilant to and through the perforations 36 which might be otherwise impaired, for example, if the contents of the can were to obstruct the perforations 36.

The operation of the apparatus is as follows. The user prepares the instruments and apparatus to be sterilized by cleaning and drying them and then wrapping them in a permeable wrapping 52 (e.g. cloth or paper) in the manner conventional for steam sterilization. The open top bag 14 is placed in the container 32. The ampule 10 in the sealed bag 12 is manually and forcibly broken as previously described by canting the stopper 18 to release the sterilant vapor into the bag 12 which remains sealed. The release of sterilant vapor into the sealed bag 12 is readily evidenced by the increase in volume of the bag 12 so that this serves as a readily discernable indication that the sterilant has been properly released. The activated ampule 10 in its sealed bag 12 is then placed in the bottom of the container 32 within the bag 14 and the items to be sterilized are placed on top of the bag 12. The open top of the bag 14 is then closed such as by a wire twist seal 54 of the type in which a wire is encased in a paper shield and as is commonly used to seal food in polyethylene bags prior to storage in a freezer. The cover 34 is then placed on the container 32 and suitably secured thereon, and the whole assembly is inverted to a position such as shown in FIG. 6. The user then notes the date and hour that the system was activated and after a predetermined time, the container 32 may be set upright, the cover 34 removed, and the sterilized items 16 removed and used.

Investigation made in connection with this invention shows that to obtain consistent and satisfactory sterilization of most materials within certain periods of time, for example 12 hours, at room temperature and atmospheric pressure, the concentration of ethylene oxide vapor within the bag 14 must be above approximately 30,000 parts per million which, as previously mentioned, is flammable and, if contained, explosive, and further that a peak concentration of approximately 100,000 parts per million satisfactorily provides an ample safety factor for sterilization. Further investigation has shown that concentration of ethylene oxide of approximately 25,000 parts per million, which is below the ignitible concentration in air, will give reliable sterilization in longer periods of time, for example, forty-eight hours. However, in order to maintain this minimum concentration for a period as long as four days, the semi-permeable bag 12 would have to be heavier and hence less permeable than that required for twelve hour sterilization at peak concentration of 100,000 parts per million. Thus, by hypothetical example, where a 3 mil bag may be satisfactory to provide the stated 12 hour sterilization, a bag in the order of 8 to 10 mil thickness may be required for the stated forty-eight hour cycle.

Merely by way of example the following design characteristics have been found to provide satisfactory sterilization under atmospheric temperature and pressure conditions on the aforementioned 12 hour sterilization cycle where a peak concentration of approximately 100,000 parts per million is reached: an ampule of five cubic centimeters capacity containing two cubic centimeters of liquified ethylene oxide, an inner bag 12 made from a 3 mil polyethylene sleeve which measures four by seven inches across the flats, an outer bag 14 also made from 3 mil polyethylene and measuring twelve inches by eighteen inches across the flats, and a container 32 of eight inch diameter and eight quart capacity having a lid with several one-quarter inch openings. Apparatus constructed as described above will provide a peak concentration of approximately 100,000 parts per million in the bag 14 within approximately three hours, but because of diffusion through bag 14, the concentration within the bag 14 will fall below 30,000 parts per million before the twelve hours has expired. Thus the sterilant is sufficiently shielded within the bag 14 from inadvertent ignition during that part of the sterilization cycle where the concentration of ethylene oxide vapor is above 30,000 parts per million (and hence flammable) while the concentration in the bag 14 at the end of the 12 hour cycle is below the 30,000 parts per million level and hence no longer presents a fire or explosion hazard. The controlled release of ethylene oxide vapor into room air by the above described system will not raise the concentration thereof in the average room above one part per million which is substantially under the one hundred parts per million below which ethylene oxide vapor mixed with air can be continuously breathed with safety.

The safety of the operator using the above described system is assured by the small quantity of ethylene oxide vapor used as well as the effective shielding of the ethylene oxide and air mixture during the portion if the sterilization cycle when it is potentially flammable or explosive.

Although in the illustrated embodiment the container 32 has been described as a component distinct from the outer bag 14, it will be understood that the functioning of the bag 14 and container 32 may be combined into a single unit in which sterilization may be carried out at room temperature and atmospheric pressure. This may be accomplished by utilizing a single container (in place of the illustrated bag 14 and container 32) made out of polyethylene-paper-aluminum foil laminate or conductive rubber for example. In some cases, the bag 14 and container 32 may be dispensed with and the bag 12 and instruments 16 placed in cardboard boxes suitably lined with conductive material (e.g. metallic foil) for storage of instruments in warehouses or other places over long periods of time. In such a case suitable safety precautions should be taken to provide protection against the toxicity and flammability of the sterilant.

It will be noted that the bags 12 and/or 14 may be made from materials other than polyethylene, for example from polystyrene, arcylic, or polyvinyl chloride.

If it is desired to further control the release of sterilant within the bag 12, the sterilant may be compounded with a substantially saturated hydrocarbon. Thus, the essentially saturated hydrocarbon may be dissolved or dispersed in a liquid sterilant. For example, ethylene oxide may be mixed or absorbed into an essentially saturated hydrocarbon such as polystyrene. Dissolving the ethylene oxide in polystyrene will form a gel such that the release of ethylene oxide therefrom will not be as rapid as is the release of ethylene oxide vapor from pure ethylene oxide liquid. This retardation is brought about because the polystyrene lowers the vapor pressure and hence increases the boiling point of the ethylene oxide. The vaporization of ethylene oxide from the surface of the gel cools the surface, hardening the gel and causing it to form a membrane on the surface which further inhibits release. If desired, cotton webbing or other materials may be used to slow down the vaporization of the sterilant.

Figure 7:
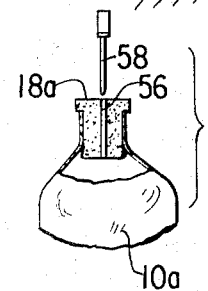
FIG. 7 is an enlarged partial sectional view of a sterilant ampule illustrating an alternate embodiment.

As an alternate embodiment, the sterilant vapor may be released from an ampule sterilant container directly into the outer enclosure (e.g. bag 14). This may be accomplished by the use of an orifice or passageway suitably located in the sterilant container such as in the stopper. As shown in FIG. 7, the stopper 18a in the sterilant container 10a is provided with a relatively small passageway 56 which receives a closure member such as the pin 58 to prevent release of sterilant. Removal of the pin 58 allows the gaseous sterilant to pass through the passageway 56 such that when the container 10a is placed in an enclosure such as the bag 14, the released sterilant will enter the bag 14 and sterilize the instruments therein. It will be observed that this alternate embodiment does not require an inner enclosure such as the bag 12. The release of sterilant is controlled by the passageway 56 and by compounding the sterilant with a substantially saturated hydrocarbon which, as previously mentioned, acts to retard the rate of release of sterilant from the gelled compound. The rate of release will accordingly be controlled to provide the required concentrations of sterilant in the outer enclosure for the desired duration.

As a further alternate embodiment, the stopper used in the neck of the ampule may be inserted after the ampule is filled by maintaining the filling apparatus at a temperature below the boiling point of the sterilant. Thus, the sterilant may be gelled, as previously mentioned, prior to the filling of the ampule so that the gelled compound may be placed in the ampule through the open neck. The ampule stopper is then seated in the neck and acts as a vapor barrier between the body of the ampule and the neck at the time of heat sealing.

It will be understood that the method and apparatus of the present invention may be employed for sterilization of various types of apparatus, supplies and equipment whether they be within or outside the confines of the medical and dental professions.

From the above, it will be evident that the illustrated apparatus and method provide for safely filling an ampule with a volatile and flammable sterilant and also facilitates release of the sterilant from the ampule when desired. The illustrated embodiment further provides for controlled release of the gaseous sterilant to the atmosphere by the use of an inner and outer enclosure utilizing semipermeable membranes. The rate of diffusion of the gaseous sterilant across the semi-permeable membranes of the inner enclosure is controlled to allow ample time for the user to release the vapor from the ampule, verify its release, and place it inside the outer enclosure containing the items to be sterilized. The permeability characteristics of the outer enclosure are such that the concentration of the gaseous sterilant therewithin reaches a concentration sufficient for sterilization but still allows for the dispersal of the gaseous sterilant through the outer enclosure so that at the end of the cycle, the outer enclosure is safe to handle and open. The rate of dispersal of the gaseous sterilant from the outer enclosure is controlled so that neither toxic nor explosive levels of the vapor will be reached in the surrounding atmosphere.

The invention hereinabove described may be varied in construction within the scope of the claims, for the particular device selected to illustrate the invention is but one of the many possible embodiments. The invention, therefore, is not to be restricted to the precise details of the structure shown and described.

What we claim is:

1. Apparatus for sterilizing articles comprising, a sealed first enclosure made at least partially of a gas permeable plastic film, a sealed container releasably containing a gaseous sterilant under pressure, said container being enclosed within said first enclosure, an openable second enclosure made at least partially of a gas permeable plastic film, the first enclosure and the articles to be sterilized being contained in said second enclosure, the sterilant being characterized by toxicity and flammability when released from its container, the permeability of the first enclosure being predetermined to permit diffusion of the sterilant into the second enclosure at a rate capable of establishing sterilization conditions in said second enclosure, and the permeability of the second enclosure being predetermined to maintain sterilization conditions therein while diffusing the sterilant to ambient air at a non-toxic, non-flammable concentration during the time required for sterilization and at the end of that time.

2. Apparatus according to claim 1 in which said second enclosure is an open top bag, and means are provided for closing the bag after the first enclosure and the articles to be sterilized have been placed therein.

3. Apparatus according to claim 1 in which said container is a sealed ampule having a longitudinally extending spout, a narrow neck on said spout and a score line in said neck for facilitating fracturing of the container for release of sterilant.

4. Apparatus according to claim 1 which includes conductor means about said second enclosure defining an electrical conductor to aid in preventing accidental ignition of the sterilant, said conductor means comprising a rigid fireproof container provided with means for dispersal of gaseous sterilant to the ambient air and adapted to shield the sterilant from open flame.

5. Apparatus according to claim 1 wherein said sterilant is ethylene oxide.

6. Apparatus according to claim 1 in which the sealed container is provided with means adapted to facilitate release of the sterilant.

7. Apparatus according to claim 6 in which said container is fracturable and further comprising an open end protective sleeve extending about said container to protect said first enclosure from contact with said container after fracture of same.

8. Apparatus according to claim 7 in which said sleeve is made of a flexible material to provide for manipulation and flexing thereof to effect fracturing of the container.

References Cited

UNITED STATES PATENTS

| | | | |
|---|---|---|---|
| 1,207,814 | 12/1916 | Stockton | 21—2 XR |
| 1,991,938 | 2/1935 | Houghton | 21—108 |
| 2,173,528 | 9/1939 | Beale. | |
| 2,283,867 | 5/1942 | Flosdorf et al. | 21—2 XR |
| 2,342,406 | 2/1944 | Latta et al. | 21—109 XR |
| 2,370,768 | 3/1945 | Baerwald | 21—58 XR |
| 2,384,398 | 9/1945 | Raven | 21—91 |
| 2,572,669 | 10/1951 | Sarge et al. | 21—109 |
| 2,871,526 | 2/1959 | Bulloff | 21—108 |
| 2,917,878 | 12/1959 | Carnarius | 99—225 XR |
| 2,928,717 | 3/1960 | Eberl et al. | 21—58 |
| 2,965,936 | 12/1960 | Kay | 21—91 |
| 3,016,284 | 1/1962 | Trexler | 21—2 |
| 3,096,148 | 7/1963 | Walker | 21—108 XR |
| 3,183,057 | 5/1965 | Marks et al. | 21—108 XR |
| 3,346,398 | 10/1967 | Tundermann et al. | 99—225 XR |

MORRIS O. WOLK, Primary Examiner

JOSEPH T. ZATARGA, Assistant Examiner

U.S. Cl. X.R.

21—58, 83, 109